(12) United States Patent
Wittberg et al.

(10) Patent No.: US 9,681,439 B2
(45) Date of Patent: Jun. 13, 2017

(54) METHOD AND ARRANGEMENT IN A TELECOMMUNICATION SYSTEM

(75) Inventors: Mikael Wittberg, Uppsala (SE); Mattias Bergström, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 898 days.

(21) Appl. No.: 13/635,557

(22) PCT Filed: Jun. 7, 2012

(86) PCT No.: PCT/SE2012/050610
§ 371 (c)(1),
(2), (4) Date: Sep. 17, 2012

(87) PCT Pub. No.: WO2013/115691
PCT Pub. Date: Aug. 8, 2013

(65) Prior Publication Data
US 2013/0195030 A1     Aug. 1, 2013

Related U.S. Application Data (60) Provisional application No. 61/592,740, filed on Jan. 31, 2012.

(51) Int. Cl.
H04W 4/00     (2009.01)
H04W 72/04    (2009.01)
H04W 74/00    (2009.01)

(52) U.S. Cl.
CPC ..... *H04W 72/0446* (2013.01); *H04W 72/044* (2013.01); *H04W 74/006* (2013.01)

(58) Field of Classification Search
None
See application file for complete search history.

(56) References Cited

U.S. PATENT DOCUMENTS 8,280,391 B2 * 10/2012 Kim .................. H04W 74/0833
                                                    370/329
8,705,467 B2 *  4/2014 Korhonen ........... H04W 74/006
                                                    370/252

OTHER PUBLICATIONS

International Search Report in corresponding International Application No. PCT/SE2012/050610 mailed Oct. 1, 2012.
Written Opinion of the International Searching Authority in corresponding International Application No. PCT/SE2012/050610 mailed Oct. 1, 2012.

(Continued)

*Primary Examiner* — Candal Elpenord
*Assistant Examiner* — Hardikkumar Patel
(74) *Attorney, Agent, or Firm* — Patent Portfolio Builders PLLC (57) ABSTRACT

Systems and methods avoid the need to coordinate preambles between UEs performing random access on their PCells and SCells. According to an embodiment, a method for random access in a radio communication system includes: transmitting, by a network node, a random access response including a Radio Network Temporary Identifier (RNTI) which has a first value if the random access is associated with a first cell and a second value if the random access is associated with a second cell, the first value being different than the second value and the first cell being different from the second cell.

6 Claims, 10 Drawing Sheets

(56) References Cited

OTHER PUBLICATIONS

Samsung; "Discussions on Msg2 location and monitoring for SCell RA"; 3GPP TSG-RAN WG2#77; R2-120502; 3rd Generation Partnership Project (3GPP); XP050565222; Feb. 6-10, 2012; pp. 1-5; Dresden, Germany.
Nokia Siemens Networks, Nokia Corporation; "RA procedure on SCell"; 3GPP TSG-RAN WG2 Meeting #76; R2-115804; 3rd Generation Partnership Project (3GPP); XP050564312; Nov. 14-18, 2011; pp. 1-4; San Francisco, CA.
Potevio; "Considerations on CBRA on SCell and Msg2 for SCell RA"; 3GPP TSG-RAN WG2 Meeting #76; R2-115817; 3rd Generation Partnership Project (3GPP); XP050564015; Nov. 14-18, 2011; pp. 1-5; San Francisco, CA.
Alcatel-Lucent, Alcatel-Lucent Shanghai Bell; "RA procedure on SCell"; 3GPP TSG-RAN WG2 #77; R2-120603; 3rd Generation Partnership Project (3GPP); XP050565204; Feb. 6-10, 2012; pp. 1-5; Dresden, Germany.
Nokia Siemens Networks, Nokia Corporation; "Cross scheduling for RACH on SCell"; 3GPP TSG-RAN WG2 Meeting #75; R2-114019; 3rd Generation Partnership Project (3GPP); XP050539924; Aug. 22-26, 2011; pp. 1-3; Athens, Greece.
3GPP; "3rd Generation Partnership Project; Technical Specification Group Radio Access Network; Evolved Universal Terrestrial Radio Access (E-UTRA); Medium Access Control (MAC) protocol specification (Release 11)"; 3GPP TS 36.321 V11.0.0; Technical Specification; Sep. 2012; pp. 1-55; Valbonne, France.

\* cited by examiner

TRANSMITTING, BY A NETWORK NODE, A RANDOM ACCESS RESPONSE INCLUDING A RADIO NETWORK TEMPORARY IDENTIFIER (RNTI) WHICH HAS A FIRST VALUE IF THE RANDOM ACCESS IS ASSOCIATED WITH A FIRST CELL OR A SECOND VALUE IF THE RANDOM ACCESS IS ASSOCIATED WITH A SECOND CELL, WHEREIN THE FIRST VALUE IS DIFFERENT THAN THE SECOND VALUE AND THE FIRST CELL IS DIFFERENT FROM THE SECOND CELL ─84

FIG. 14

RECEIVING, BY A TRANSCEIVER IN A USER EQUIPMENT (UE), A RANDOM ACCESS RESPONSE INCLUDING A RADIO NETWORK TEMPORARY IDENTIFIER (RNTI) WHICH HAS A FIRST VALUE IF THE RANDOM ACCESS IS ASSOCIATED WITH A FIRST CELL OR A SECOND VALUE IF THE RANDOM ACCESS IS ASSOCIATED WITH A SECOND CELL, WHEREIN THE FIRST VALUE IS DIFFERENT THAN THE SECOND VALUE AND THE FIRST CELL IS DIFFERENT FROM THE SECOND CELL ~86

FIG. 15

METHOD AND ARRANGEMENT IN A TELECOMMUNICATION SYSTEM

TECHNICAL FIELD

The present invention relates to avoiding preamble collisions when performing random access on a secondary cell.

BACKGROUND

Figure 1:
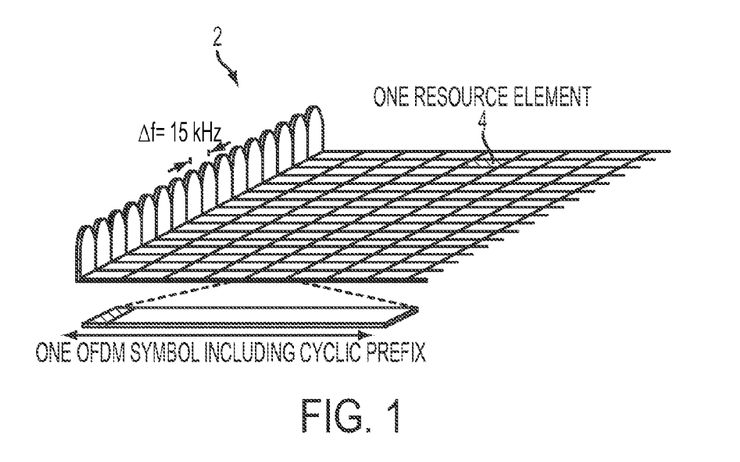
FIG. 1 depicts a Long Term Evolution (LTE) downlink physical resource.

Long Term Evolution (LTE) uses orthogonal frequency division multiplexing (OFDM) in the downlink and discrete Fourier Transform (DFT)-spread OFDM in the uplink. The basic LTE downlink physical resource can thus be seen as a time-frequency grid 2 as illustrated in FIG. 1, where each resource element 4 corresponds to one OFDM subcarrier during one OFDM symbol interval.

Figure 2:
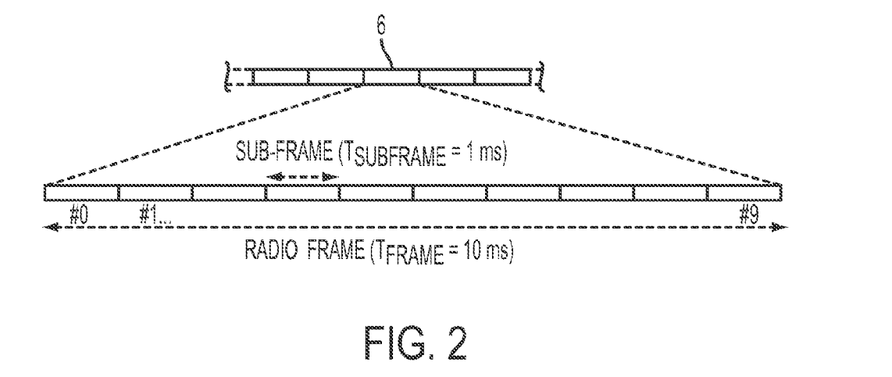
FIG. 2 shows an LTE time-domain structure.

In the time domain, LTE downlink transmissions, as shown in FIG. 2, are organized into radio frames of 10 ms, each radio frame 6 consisting of ten equally-sized subframes of length $T_{subframe}=1$ ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a user equipment (UE) is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Figure 3:
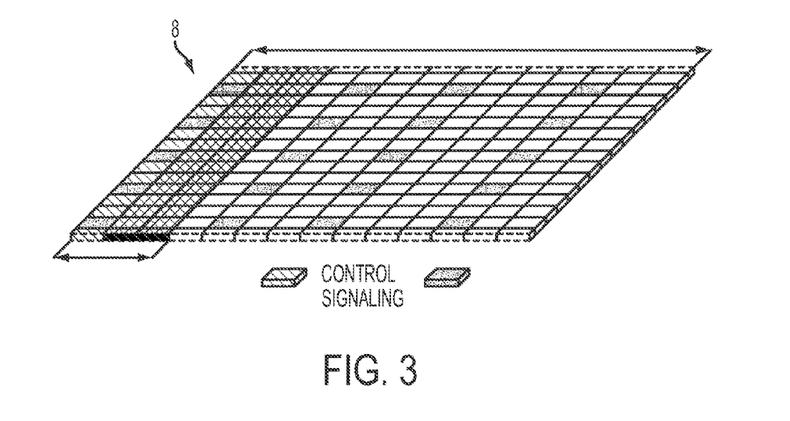
FIG. 3 illustrates a downlink subframe.

Downlink transmissions are dynamically scheduled, i.e., in each subframe the base station transmits control information about which UEs data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of, e.g., the control information. A downlink system 8 with CFI=3 OFDM symbols for control signaling is illustrated in FIG. 3.

Carrier Aggregation

The LTE Rel-10 specifications have recently been standardized, supporting Component Carrier (CC) bandwidths up to 20 MHz (which is the maximal LTE Rel-8 carrier bandwidth). Hence, an LTE Rel-10 operation wider than 20 MHz is possible and appears as a number of LTE carriers to an LTE Rel-10 UE.

Figure 4:
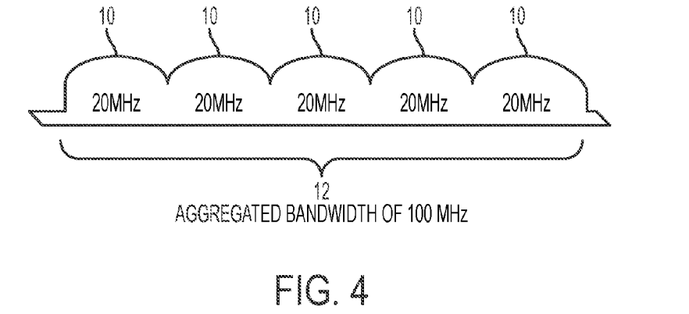
FIG. 4 shows an example of Carrier Aggregation.

In particular for early LTE Rel-10 deployments it can be expected that there will be a smaller number of LTE Rel-10 capable UEs compared to many LTE legacy UEs. Therefore, it is necessary to assure an efficient use of a wide carrier also for legacy UEs, i.e., that it is possible to implement carriers where legacy UEs can be scheduled in all parts of the wideband LTE Rel-10 carrier. The straightforward way to obtain this would be by means of Carrier Aggregation (CA). CA implies that an LTE Rel-10 UE can receive multiple CC, where the CC have, or at least the possibility to have, the same structure as a Rel-8 carrier. CA is illustrated in FIG. 4 which shows five 20 MHz bandwidths 10 and the aggregated bandwidth 12 of 100 MHz.

The Rel-10 standard supports up to 5 aggregated carriers where each carrier is limited in the radio frequency (RF) specifications to have a one of six bandwidths namely 6, 15, 25, 50, 75 or 100 RBs (corresponding to 1.4, 3, 5, 10, 15, and 20 MHz respectively).

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in the network may be different from the number of CCs seen by a UE. A UE may, for example, support more downlink CCs than uplink CCs, even though the network offers the same number of uplink and downlink CCs.

During initial access a LTE Rel-10 UE behaves similarly to a LTE Rel-8 UE. Upon successful connection to the network a UE may, depending on its own capabilities and the network, be configured with additional CCs in the UL and DL. Configuration is based on radio resource control (RRC). Due to the heavy signaling, and the rather slow speed of RRC signaling, it is envisioned that a UE may be configured with multiple CCs even though not all of them are currently used. If a UE is activated on multiple CCs this would imply it has to monitor all downlink (DL) CCs for physical downlink control channel (PDCCH) and physical downlink shared channel (PDSCH). This implies a wider receiver bandwidth, higher sampling rates, etc., resulting in high power consumption.

Component Carrier Types

Initially, the user equipment will be configured with one UL/DL pair of component carriers, on which it made the initial random access. These component carriers are together called the Primary Cell (PCell).

The uplink (UL) PCell is configured with Physical Uplink Control Channel (PUCCH) and used for transmission of Layer 1 (L1) uplink control information. This also includes (Channel State Information) CSI for the DL transmission on the activated SCells.

In addition to the PCell, the base station may configure the user equipment with additional serving cells, so called "Secondary Cells" (SCells) as extra resources when needed. The user equipment may be configured with one or more, up to four SCells.

Random Access

Figure 5:
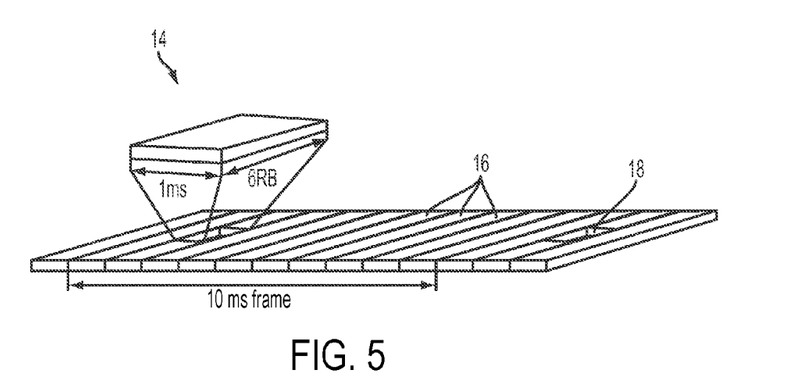
FIG. 5 is an illustration of a random access preamble transmission.

In LTE, as in any communication system, a UE may need to contact the network (via the eNodeB) without having a dedicated resource in the Uplink (from UE to base station). To handle this, a random access procedure is available where a UE that does not have a dedicated UL resource may transmit a signal to the base station. The first message of this procedure is typically transmitted on a special resource reserved for random access, a physical random access channel (PRACH). This channel can for instance be limited in time and/or frequency (as in LTE). FIG. 5 illustrates random access preamble transmission 14 including uplink resources used for data transmission 16 and uplink resources reserved for random access preamble transmission 18. The resources available for PRACH transmission are provided to the UEs as part of the broadcasted system information (or as part of dedicated RRC signaling in case of, e.g., handover).

Figure 6:
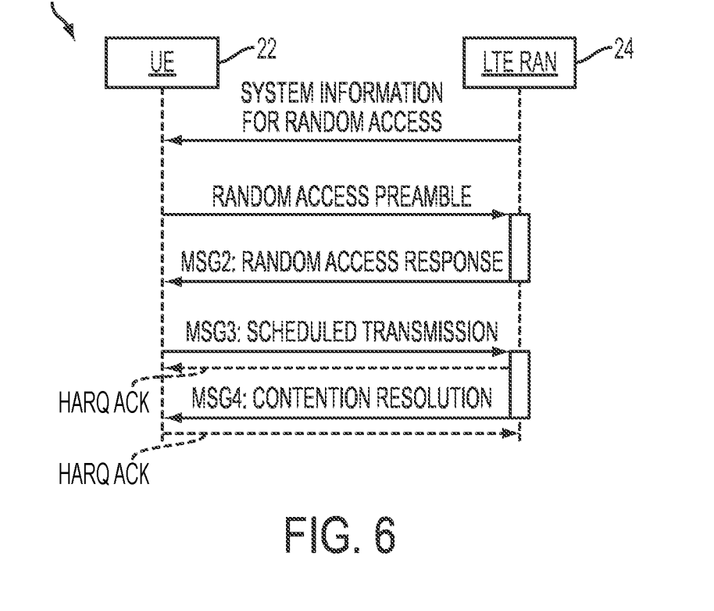
FIG. 6 shows signalling over an air interface for a contention based random access procedure in LTE.

In LTE, the random access procedure can be used for a number of different reasons including:
- Initial access (for UEs in the LTE IDLE or LTE DETACHED states)
- Incoming handover
- Resynchronization of the UL
- Scheduling request (for a UE that is not allocated any other resource for contacting the base station)
- Positioning The contention-based random access procedure 20 used between a UE 22 and an LTE RAN 24 in LTE is illustrated in FIG. 6. Initially, the UE 22 receives system information for random access 26 from the LTE RAN 24. The UE 22 starts the random access procedure by randomly selecting one of the preambles available for contention-based random access as shown in block 27. The UE 22 then transmits the selected random access preamble on the PRACH to an eNode B in the LTE RAN 24 in step 28.

The RAN acknowledges any preamble it detects by transmitting a random access response (MSG2) 30 including an initial grant to be used on the uplink shared channel, a temporary cell-radio network temporary identifier (C-RNTI), and a time alignment (TA) update based on the timing offset of the preamble measured by the eNodeB on the PRACH. The MSG2 30 is transmitted in the DL to the UE 22 and its corresponding PDCCH message CRC is scrambled with the RA-RNTI.

When receiving the response the UE 22 uses the grant to transmit a message (MSG3) 32 that in part is used to trigger the establishment of radio resource control and in part to uniquely identify the UE 22 on the common channels of the cell. The timing alignment command provided in the random access response is applied in the UL transmission in MSG3 32. The eNB can change the resources blocks that are assigned for a MSG3 32 transmission by sending an UL grant the CRC of which can be scrambled with the temporary cell-radio network temporary identifier (TC-RNTI).

The MSG4 34 which is then contention resolution has its PDCCH CRC scrambled with the C-RNTI if the UE previously has a C-RNTI assigned. If the UE does not have a C-RNTI previously assigned its PDCCH CRC is scrambled with the TC-RNTI.

Figure 7:
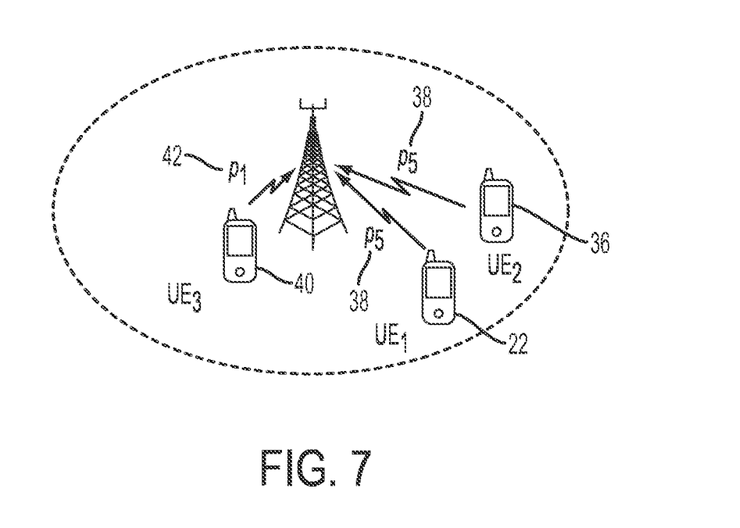
FIG. 7 depicts contention between two UEs.

The procedure ends with the LTE RAN 24 solving any preamble contention that may have occurred for the case where multiple UEs transmitted the same preamble at the same time. This can occur since each UE randomly selects when to transmit and which preamble to use. If multiple UEs select the same preamble for the transmission on the RACH, there will be contention between these UEs that needs to be resolved through the contention resolution message (MSG4) 34. The case when contention occurs is illustrated in FIG. 7, where two UEs, UE1 22 and UE2 36, transmit the same preamble, $p_5$ 38, at the same time. A third UE, UE3 40, also transmits at the same RACH, but since it transmits with a different preamble, $p_1$ 42, there is no contention between UE3 40 and the other two UEs (UE1 22 and UE2 36).

The UE 22 can also perform non-contention based random access. A non-contention based random access or contention free random access can, e.g., be initiated by the eNB to get the UE 22 to achieve synchronisation in UL. The eNB initiates a non-contention based random access either by sending a PDCCH order or indicating it in an RRC message. The latter of the two is used in case of handover (HO).

Figure 8:
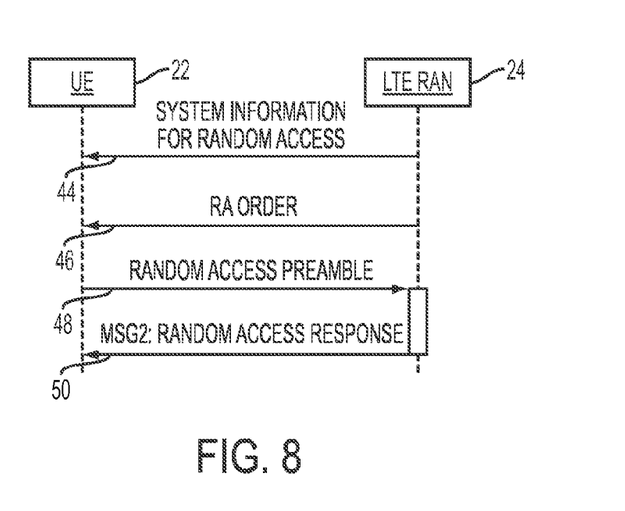
FIG. 8 illustrates signalling over the air interface for contention-free random access procedure in LTE.

The eNB can also order the UE 22 through a PDCCH message to perform a contention based random access, the procedure for this is illustrated in FIG. 7. The procedure for the UE 22 to perform contention free random access is illustrated as shown in FIG. 8. The UE 22 receives system information for random access 44 and a random access order 46 from the LTE RAN 24. The UE 22 then transmits a random access preamble to the LTE RAN 24. Similar to the contention based random access the MSG2 30 is transmitted in the DL to the UE 22 and its corresponding PDCCH message CRC is scrambled with the RA-RNTI. The UE 22 considers the contention resolution successfully completed after it has received MSG2 50 successfully.

For the contention free random access, as for the contention based random access, the MSG2 50 contains a timing alignment value. This enables the eNB to set the initial/updated timing according to the UEs transmitted preamble.

In LTE in Rel-10 the random access procedure is limited to the primary cell only. This implies that the UE 22 can only send a preamble on the primary cell. Further MSG2 30 and MSG3 32 is only received and transmitted on the primary cell. MSG4 34 can however in Rel-10 be transmitted on any DL cell.

In LTE Rel-11, the current assumption is that the random access procedure will be supported also on secondary cells, at least for the UEs supporting Rel-11 carrier aggregation. So far only network initiated random access on SCells is assumed.

SUMMARY

It is an object of exemplary embodiments to avoid the need to coordinate preambles between UEs performing random access on a first cell, e.g., their PCell, with UEs performing random access on a second cell, e.g., one of their SCell(s), using the same PCell as the legacy UE. By using the exemplary systems and methods described herein, there can be a reduction of preamble conflicts in UEs. It will be appreciated by those skilled in the art, however, that the invention is not limited to those embodiments which produce any or all of these advantages or benefits and that other advantages and benefits may be realized depending upon the particular implementation.

According to an exemplary embodiment, there is a method for handling random access in a radio communication system comprising: transmitting, by a network node, a random access response including a Radio Network Temporary Identifier (RNTI) which has a first value if the random access is associated with a first cell or a second value if the random access is associated with a second cell, wherein the first value is different than the second value and the first cell is different from the second cell.

The above-described network node method can be implemented in a network node having a transceiver which is configured to perform the method.

According to another exemplary embodiment, there is a network node capable of handling random access in a radio communication system comprising: a processor configured to generate a random access response including a Radio Network Temporary Identifier (RNTI) which has a first value if the random access is associated with a first cell or a second value if the random access is associated with a second cell, wherein the first value is different than the second value and the first cell is different from the second cell; and a transceiver configured to transmit the random access response.

According to another exemplary embodiment, there is a method for performing random access in a radio communication system comprising: receiving, by a transceiver in a user equipment (UE), a random access response including a Radio Network Temporary Identifier (RNTI) which has a first value if the random access is associated with a first cell or a second value if the random access is associated with a second cell, wherein the first value is different than the second value and the first cell is different from the second cell.

The above-described UE method can be implemented in a UE having a transceiver which is configured to perform the method.

According to another exemplary embodiment, there is a user equipment (UE) capable of performing random access in a radio communication system comprising: a transceiver configured to receive a random access response including a Radio Network Temporary Identifier (RNTI) which has a first value if the random access is associated with a first cell or a second value if the random access is associated with a second cell, wherein the first value is different than the second value and the first cell is different from the second cell.

Other objects, advantages and novel features of the invention will become apparent from the following detailed description of the invention when considered in conjunction with the accompanying drawings.

ABBREVIATIONS

3GPP $3^{rd}$ Generation Partnership Project
AL Aggregation Layer
CA Carrier Aggregation
CC Component Carrier
CCE Control Channel Elements
CFI Control Format Indicator
CRC Cyclic Redundancy Check
C-RNTI Cell-Radio Network Temporary Identifier
DFT Discrete Fourier Transform
DL Downlink
eNB Evolve Node B
HO Handover
LTE Long Term Evolution
OFDM Orthogonal Frequency-Division Multiplexing
PCC Primary component carrier
PCell Primary cell
PDCCH Physical Downlink Control Channel
PRACH Physical Random Access Control Channel
PRB Physical Resource Block
RACH Random Access Control Channel
RA Random Access
RA-RNTI Random Access-Radio Network Temporary Identifier
RB Resource Block
RAN Radio Access Network
RF Radio Frequency
RNTI Radio Network Temporary Identifier(s)
RRC Radio Resource Control
SCC Secondary component carrier
SCell Secondary cell
TA Timing Advance
TC-RNTI Temporary Cell-Radio Network Temporary Identifier
UE User Equipment
UL Uplink
VRB Virtual Resource Block

A BRIEF DESCRIPTION OF THE DRAWINGS

The accompanying drawings illustrate exemplary embodiments, wherein.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Embodiments of the present invention are described within the context of Evolved-Universal Mobile Telecommunications System Terrestrial Radio Access Network (E-UTRAN), also referred to as Long Term Evolution (LTE). It should be understood that the problems and solutions described herein are equally applicable to wireless access networks and user-equipments (UEs) implementing other access technologies and standards. LTE is used as an example technology where the invention is suitable, and using LTE in the description therefore is particularly useful for understanding the problem and solutions solving the problem and the use of LTE terminology should not be seen as limiting to this particular technology.

Currently the LTE Rel-11 specification allows random access to be ordered by the eNB both on the primary cell (PCell) and on a secondary cell (SCell). The details of how the random access response message is to be handled in Rel-11 for an SCell have not yet been agreed upon, but one solution that is discussed is to extend the existing random access procedure used on a PCell with the following changes:

The random access response message (MSG2) is scheduled on physical downlink control channel (PDCCH) on the PCell.

The random access response message (MSG2) is sent on the physical downlink shared channel (PDSCH) on the PCell.

Note that this solution means that the MSG2 is always scheduled and sent on the PCell, even in case the random access preamble message was sent on an SCell. Hence, when performing random access on an SCell the MSG2 message is scheduled and sent on another cell than the cell on which the random access is performed and where the random access preamble message is sent.

This handling of MSG2 for an SCell has the problem that the preamble number sent on the SCell must also be unique in the PCell, since the random access response message is sent on the PCell. For example, if two UEs, UE1 22 and UE2 36, were to be configured with the same cells as PCell and UE1 22 performs a random access procedure on its PCell while UE2 36 performs a random access procedure on one of its SCells, then UE1 22 and UE2 36 cannot use the same preamble since they both will receive their MSG2 30 on their PCell. This is different from the normal case when the preamble only needs to be unique within one cell, because both the preamble and the MSG2 30 message are sent on the same cell.

This problem means that the eNB must coordinate preamble numbers between different cells, and not just within the same cell, and which makes it more difficult to use the maximum number of preambles efficiently in the system.

One solution is to include the cell-radio network temporary identifier (C-RNTI) of the UE in the random access response message sent in MSG2. This C-RNTI is proposed to be included in a temporary C-RNTI field which is currently unused in random access response message when performing contention free random access (the temporary C-RNTI field is currently only used when performing contention based random access). By including the C-RNTI in the random access response message, the UE can verify whether the random access response message is intended for itself or not. Hence, this solution will make it possible to avoid the preamble coordination between cells. Note that this solution is currently discussed in 3$^{rd}$ Generation Partnership Project (3GPP), but no agreement has yet been done on whether to adopt it or not.

Even if the above solution is adopted by 3GPP, it will still leave a problem with preamble coordination due to legacy UEs (based on Rel-10 or earlier) which will not check that the included C-RNTI is their own C-RNTI. Instead the legacy UEs will only check that the preamble number is correct. Hence, the previously discussed solution will not solve the problem of distinguishing between legacy UEs performing random access on their PCell, and Rel-11 UEs performing random access on one of their SCells and operating if their PCell is the same cell as the cell where the legacy UE is performing a random access.

Figure 9:
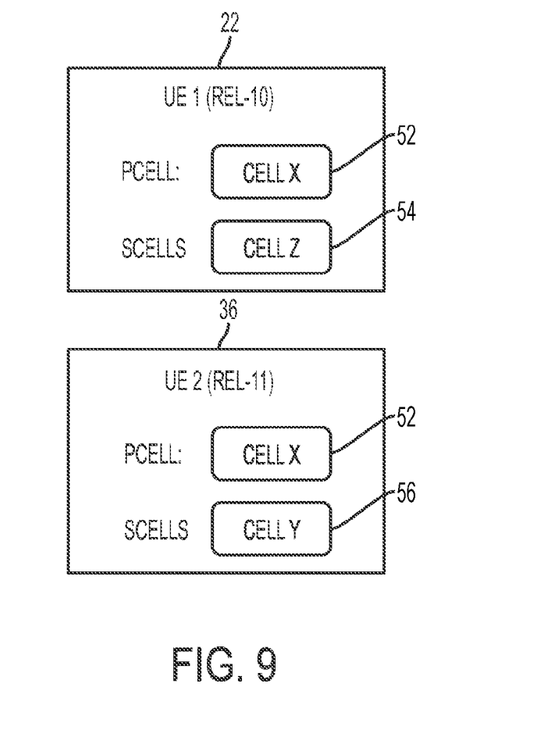
FIG. 9 shows a release-10 UE and a release-11 UE.

An example of this is shown FIG. 9 where a Rel-10 UE (UE1 22) is configured to use Cell X 52 as its PCell and Cell Z 54 as an SCell and a Rel-11 UE (UE2 36) is configured to use Cell X 52 as its PCell and Cell Y 56 as an SCell. It is assumed that MSG2 will be sent on the PCell also for a random access procedure performed on an SCell and hence the MSG2 for any random access procedure performed by UE2 36 will be sent by the eNB on Cell X 52. If this is the case UE1 22 and UE2 36 cannot use the same preamble at the same time for a random access procedure even if UE1 22 performs the random access procedure on Cell X 52 and UE2 36 performs random access procedure on Cell Y 56.

The problem that arises from this example is that the UE performing random access on an SCell is sending the MSG2 message on the same cell as the legacy UE is performing its random access on, and since the preamble is included in the random access response in MSG2, it is not possible to distinguish between these two UEs based only on the preamble, if both UEs are using the same preamble number. Therefore it is still necessary to coordinate the preambles between legacy UEs performing random access on their PCell, and Rel-11 UEs performing random access on an SCell using the same cell as the legacy UE as their PCell.

Accordingly, an exemplary method can, for example, distinguish between random access response messages scheduled on PDCCH intended for a UE performing random access on a first cell, e.g., the UE's PCell, and UEs performing random access on a second cell (which is different from the first cell), e.g., one of their SCell(s). To achieve this, the method will use different RA-RNTI values when scheduling the random access response messages for the two cases:

Random access response message for UEs performing random access on their PCell.

Random access response message for UEs performing random access on one of their SCells.

This means that UEs that are performing random access on their PCell will only receive (i.e., in the sense of reading or decoding) those random access response messages that have been scheduled with an RA-RNTI intended for a PCell, in the first group above; and UEs that are performing random access on one of their SCell will only receive (i.e., in the sense of reading or decoding) those random access response messages intended for an SCell, in the second group above. Hence, there will be no collision between preambles between these two groups, since UEs in one group will not receive (i.e., in the sense of reading or decoding) the random access response messages in the other group. Exemplary systems and methods which perform random access can be performed in various environments, e.g., contention free or contention based random access.

Figure 10:
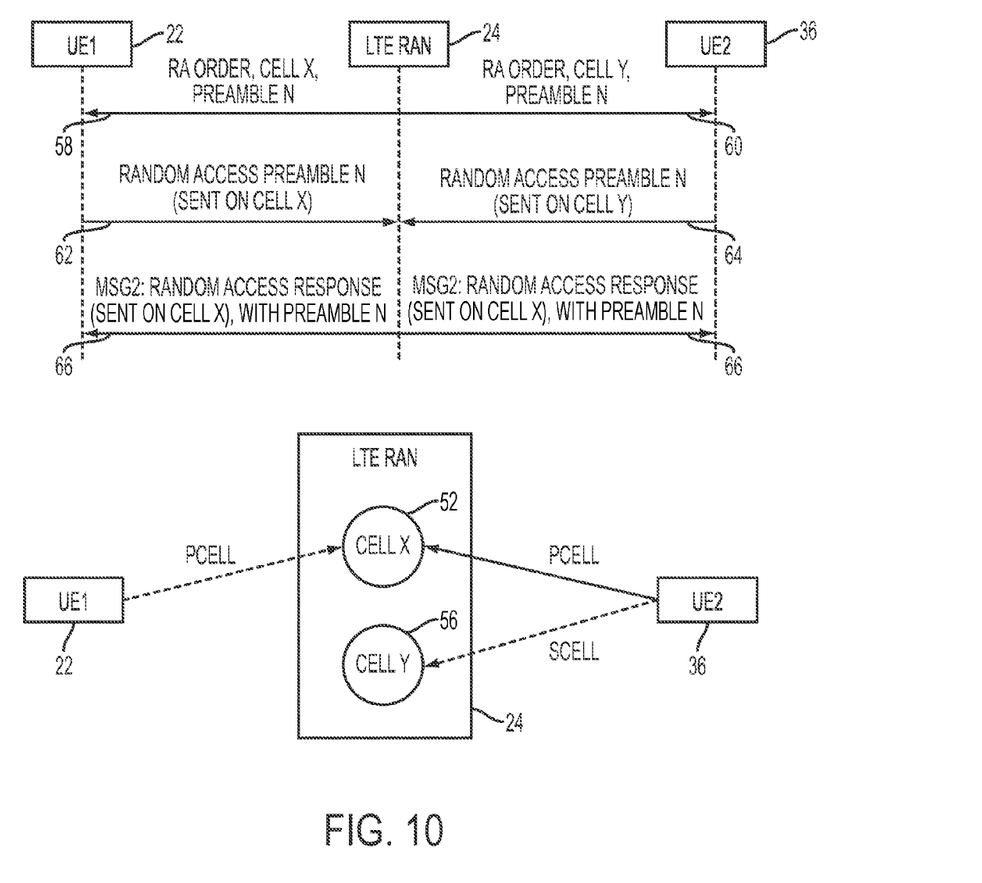
FIG. 10 shows a signalling diagram for when an exemplary embodiment can be applied.

To provide more context for a discussion of the embodiments, FIGS. 10 and 11 will be discussed which illustrate the previously described contention problem in more detail. FIG. 10 is a signaling diagram showing when the method described in these embodiments can be applied. Therein, UE1 22 and UE2 36 are performing random access on different cells while using the same cell as their PCell, i.e., Cell X 52, and are using the same preamble (N). This can be seen in messages 58 and 60. After receiving messages 58 and 60, UE1 22 transmits message 62 on Cell X 52 including the random access preamble N and UE2 36 transmits message 64 on Cell Y 54 including the random access preamble N. When the MSG2 66 is received by the UEs on the same cell, the UEs cannot know which of the two random access responses they should act on, if two random access responses will be included in the MSG2 66 with the same preamble number. If one random access response is included in the MSG2 66 in this example both UEs will act on the one random access response which will be incorrect for one of the UEs. Alternatively, for another example, an eNB in the LTE RAN 24 can send only one random access response for which both UEs 22 and 36 would act on the random access response.

Figure 11:
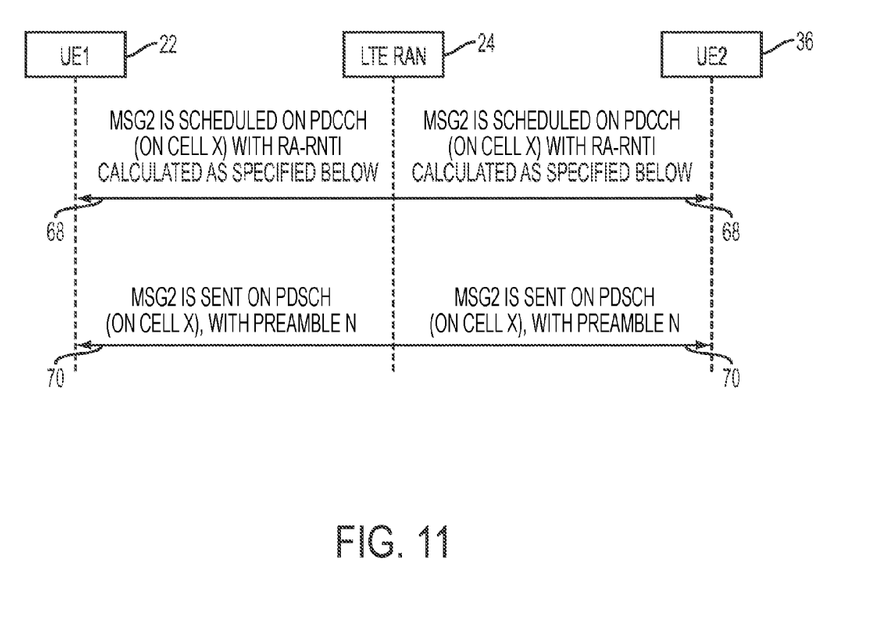
FIG. 11 illustrates how MSG2 is scheduled conventionally.

More specifically, FIG. 11 shows in more detail how the MSG2 66 is both scheduled and sent to the UEs which were depicted in FIG. 10. The diagram shows an example which uses the current, conventional method of how to calculate the RA-RNTI when scheduling MSG2 on PDCCH. Initially, MSG2 is scheduled, by the LTE RAN 24, on PDCCH on Cell X 52 for both UEs as shown in step 68. The MSG2 is then sent, by the LTE RAN 24, on PDSCH on Cell X 52 with the preamble N to both UE1 22 and UE2 36 as shown by message 70. It can be seen in the diagram of FIG. 11 that the RA-RNTI values for both UEs will be the same in this case. More specifically, in this example, the t_id and the f_id, where t_id is the index of the first subframe of the specified PRACH and f_id is the index of the specified PRACH within that subframe for both UE1 22 and UE2 36 are the same and therefore the RA-RNTI values for both UEs will be the same. In FIG. 11, the RA-RNTI values are calculated using conventional methods as described in chapter 5.1.4 of 3GPP TS 36.321, e.g., equation (1) which is described in more detail later in the specification.

According to an embodiment, as described above, a purpose of the proposed method is to distinguish between UEs performing random access on a PCell and UEs performing random access on one of their SCell(s), by using different encodings of the RA-RNTI value. The RA-RNTI value is used when scheduling the random access response message (MSG2). By using different encodings of the RA-RNTI value it is possible to distinguish between UEs that perform random access on their PCell and UEs performing random access on one of their SCells.

According to an exemplary embodiment the calculation of the RA-RNTI value will be extended from the current method as shown below in equation (1):

$$RNTI=1+t\_id+10*f\_id \quad (1)$$

to the following new method as shown below in equation (2):

$$RNTI=1+t\_id+10*f\_id+(60*is\_SCell) \quad (2)$$

where t_id is the index of the first subframe of the specified PRACH (0≤t_id<10), f_id is the index of the specified PRACH within that subframe, in ascending order of frequency domain (0≤f_id<6) and is_SCell is equal to 0 when performing RA on a PCell and equal to 1 when performing RA on an SCell.

It should be apparent to those skilled in the art that based on equation (2), random accesses performed on a PCell and performed on an SCell will never get the same RA-RNTI and hence will never collide. The reason is that the value range of the RA-RNTI will be 1.60, in case of random access on a PCell, and the value range of the RA-RNTI will be 61.120, in case of random access on an SCell for this embodiment.

Alternatively, the RA-RNTI value could be calculated as shown below in equation (3):

$$RNTI=1+t\_id+10*f\_id+(60*is\_PCell) \quad (3)$$

where t_id is the index of the first subframe of the specified PRACH (0≤t_id<10), f_id is the index of the specified PRACH within that subframe, in ascending order of frequency domain (0≤f_id<6) and is_PCell is equal to 1 when performing RA on a PCell and equal to 0 when performing RA on an SCell.

More generally, and according to another embodiment, the same general method is used as in the embodiment above, but the calculation of the RA-RNTI when performing random access on an SCell is done in any other way that makes the value different from a value used when performing random access on a PCell. That is, any method that produces an RA-RNTI value for an SCell access which is non-overlapping with the range used for a PCell access, e.g., 1 . . . 60, is considered in this embodiment.

According to an exemplary embodiment, these "new" RA-RNTI values can be an extension of currently RA-RNTI values. This can be done by extending the RA-RNTI size by a bit, with the extra bit having a flag which indicates if the RA was performed on a PCell or an SCell.

Figure 12:
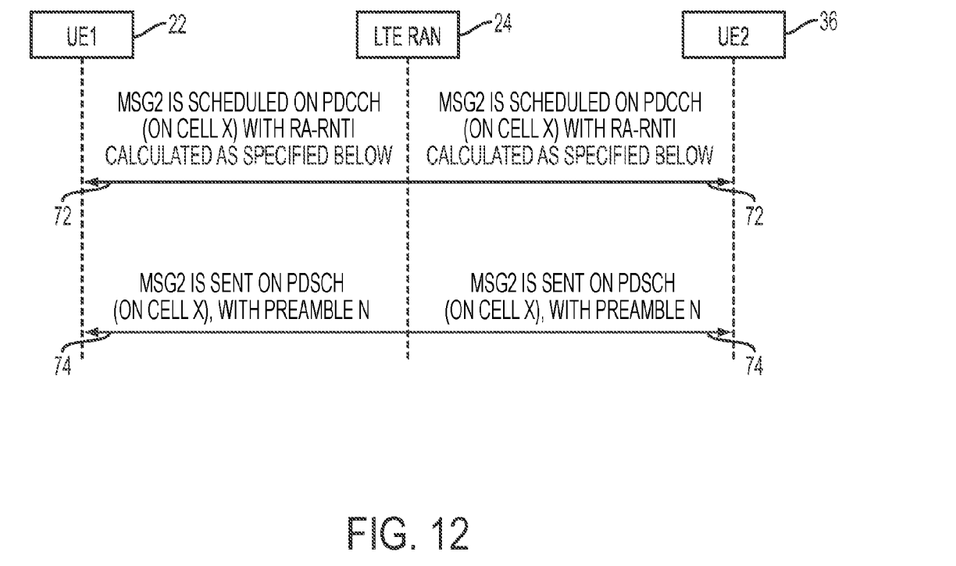
FIG. 12 shows how MSG2 is scheduled according to an exemplary embodiment.

FIG. 12 illustrates in more detail how the MSG2 is both scheduled and sent to the UEs, allowing for successful random access for both UEs, which were depicted in FIG. 10 according to an embodiment. The diagram shows the method of how to calculate the RA-RNTI described in the first embodiment used when scheduling MSG2 on PDCCH. While FIG. 12 appears similar to FIG. 11, there are differences in how the RA-RNTI is determined which allows for the successful random access for both UEs. Initially, MSG2 is scheduled, by the LTE RAN 24, on PDCCH on Cell X 52 for both UEs as shown in step 72. The MSG2 is then sent, by the LTE RAN 24, on PDSCH on Cell X 52 with the preamble N to both UE1 22 and UE2 36 as shown by message 74. It can be seen in the diagram of FIG. 12 that the RA-RNTI values for both UEs will be different in this case. More specifically, in this example which uses equation (2) described above, the t_id and the f_id for both UE1 22 and UE2 36 are the same but the is_SCell parameter is different with UE1 22 setting the parameter to 0 and UE2 36 setting the parameter to 1. Thus the RA-RNTI values for both UEs will be different.

With this proposed method it is possible to reuse the preambles between cells without causing preamble collision between different cells when there are UEs in the system that need to perform random access on both their PCell and any of their SCells. Since preambles can be reused between cells, there is less likely to be a shortage of preambles, and therefore the network can support more parallel random access procedures than what would have been possible using conventional methods.

The method steps performed by the UE can be performed by functional elements of the processing circuitry. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware (generally illustrated as a "processor" 78 in FIG. 13) may be configured to execute program code stored in memory. Since the various details and engineering tradeoffs associated with the design of baseband processing circuitry for mobile devices and wireless base stations are well known and are unnecessary to a full understanding of the invention, additional details are not shown here. The UE 76 will also typically include a transceiver 80, as seen in FIG. 13, for transmitting and receiving signals, e.g., random access responses including RNTIs whose values may vary as described above.

Figure 13:
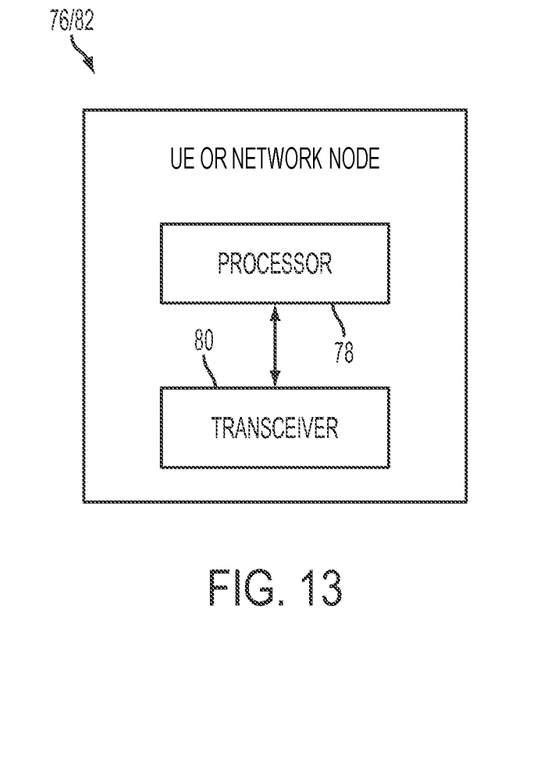
FIG. 13 shows a UE or a network node according to exemplary embodiments.

Similarly, FIG. 13 also depicts the functional elements as related to embodiments described herein for a network node 82, e.g., an E-NodeB or another network node in an LTE system, can include a processor 78 and, potentially, a transceiver 80 and memory circuit (not shown).

Figure 14:
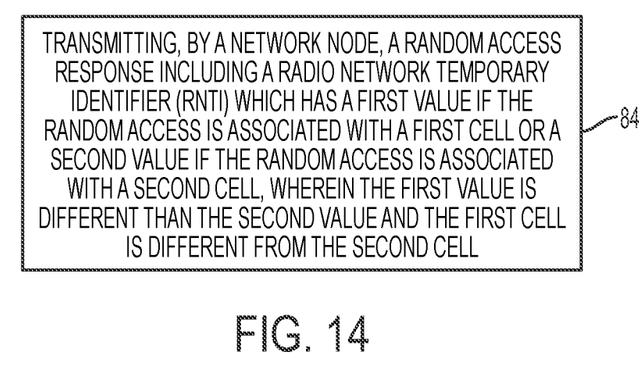
FIG. 14 shows a method flowchart according to an exemplary embodiment.

Using the above-described exemplary embodiments, a method for handling random access in a radio communication system is shown in the flowchart of FIG. 14. The method includes: at step 84, transmitting, by a network node, a random access response including a Radio Network Temporary Identifier (RNTI) which has a first value if the random access is associated with a first cell or a second value if the random access is associated with a second cell, wherein the first value is different than the second value and the first cell is different from the second cell.

Figure 15:
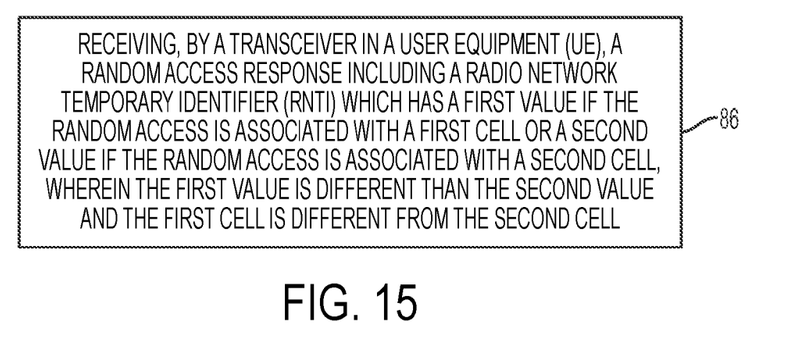
FIG. 15 shows a method flowchart according to an exemplary embodiment.

Using the above-described exemplary embodiments, another method for performing random access in a radio communication system is shown in the flowchart of FIG. 15. The method includes: at step 86, receiving, by a transceiver in a user equipment (UE), a random access response including a Radio Network Temporary Identifier (RNTI) which has a first value if the random access is associated with a first cell or a second value if the random access is associated with a second cell, wherein the first value is different than the second value and the first cell is different from the second cell.

According to an embodiment, a method for random access in a radio communication system comprising: transmitting, by a network node, a random access response including a Radio Network Temporary Identifier (RNTI) which has a first value if the random access is associated with a primary cell (PCell) and a second value if the random access is associated with a secondary cell (SCell), the first value being different than the second value. The first or second value can be generated by the network node in any desired manner, e.g., using one of the equations described below in the detailed description.

The above-described network node method can be implemented in a network node having a transceiver which is configured to perform the method.

According to another embodiment, a method for random access in a radio communication system comprises: receiving, by a user equipment (UE), a random access response including a Radio Network Temporary Identifier (RNTI) which has a first value if the random access is associated with a primary cell (PCell) and a second value if the random access is associated with a secondary cell (SCell), the first value being different than the second value.

The above-described UE method can be implemented in a UE having a transceiver which is configured to perform the method.

Program code stored in the memory circuit may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The present invention may, of course, be carried out in other ways than those specifically set forth herein without departing from essential characteristics of the invention. The present embodiments are to be considered in all respects as illustrative and not restrictive.

What is claimed is:

1. A method for handling random access in a radio communication system comprising:

determining whether a random access by a user equipment is attempted on a PCell or one of a plurality of SCells;
selecting a binary value of one or zero depending upon whether the random access is attempted on the PCell or one of the plurality of SCells;
generating a Radio Network Temporary Identifier (RNTI) that distinguishes between a random access attempt on the PCell and a random access attempt on one of the plurality of SCells; and
transmitting, by a network node, a random access response including the generated RNTI,
wherein the RNTI is generated from an equation $RNTI=1+t\_id+10*f\_id+(60*X)$, where
t_id is an index of a first subframe of a specified Physical Random Access Control Channel (PRACH) such that $0 \le t\_id < 10$,
f_id is an index of the specified PRACH within that subframe in ascending order of frequency domain such that $0 \le f\_id < 6$, and
X is the selected binary value of one or zero and is one of is_PCell and is_SCell, which indicates whether random access is performed on the PCell or on one of the plurality of SCells so that RNTI is no greater than 120,
wherein RNTIs for random access attempts on a PCell are within a range of values between 1-60,
wherein RNTIs for random access attempts on any of the plurality of SCells are within a range of values between 61-120,
wherein when the RNTI is for a random access attempt on the PCell the transmitted random access response is only read or decoded by user equipment that attempted the random access on the PCell and when the RNTI is for a random access on one of the plurality of SCells the transmitted random access response is only read or decoded by user equipment that attempted random access on one of the plurality of SCells, and
wherein the random access response is always sent over the PCell regardless of whether the random access attempt is on the PCell or one of the plurality of SCells.

2. The method of claim 1, wherein the network node is an evolved Node B (eNB).

3. A network node capable of handling random access in a radio communication system comprising:
a processor configured to
determine whether a random access by a user equipment is attempted on a PCell or one of a plurality of SCells;
select a binary value of one or zero depending upon whether the random access is attempted on the PCell or one of the plurality of SCells;
generate a random access response including a Radio Network Temporary Identifier (RNTI) that distinguishes between a random access attempt on the PCell and a random access attempt on one of the plurality of SCells; and
a transceiver configured to transmit the random access response including the generated RNTI,
wherein the RNTI is generated from an equation $RNTI=1+t\_id+10*f\_id+(60*X)$, where
t_id is an index of a first subframe of a specified Physical Random Access Control Channel (PRACH) such that $0 \le t\_id < 10$,
f_id is an index of the specified PRACH within that subframe in ascending order of frequency domain such that $0 \le f\_id < 6$, and X is the selected binary value of one or zero and is one of is_PCell and is_SCell, which indicates whether random access is performed on the PCell or on one of the plurality of SCells so that RNTI is no greater than 120, wherein RNTIs for random access attempts on a PCell are within a range of values between 1-60, wherein RNTIs for random access attempts on any of the plurality of SCells are within a range of values between 61-120, wherein when the RNTI is for a random access attempt on the PCell the transmitted random access response is only read or decoded by user equipment that attempted the random access on the PCell and when the RNTI is for a random access on one of the plurality of SCells the transmitted random access response is only read or decoded by user equipment that attempted random access on one of the plurality of SCells, and wherein the random access response is always sent over the PCell regardless of whether the random access attempt is on the PCell or one of the plurality of SCells.

4. The network node of claim 3, wherein the network node is an evolved Node B.

5. A method for performing random access in a radio communication system comprising:

performing, by a transceiver in a user equipment, a random access attempt on either a PCell or one of a plurality of SCells; and receiving, by the transceiver in the user equipment, a random access response including a Radio Network Temporary Identifier (RNTI);

determining whether the random access response is intended for the user equipment based on the RNTI using a binary value of one or zero depending upon whether the user equipment's random access attempt is on the PCell or one of the plurality of SCells, wherein the RNTI is generated from an equation RNTI=1+t_id+10*f_id+(60*X), where t_id is an index of a first subframe of a specified Physical Random Access Control Channel (PRACH) such that 0≤t_id<10, f_id is an index of the specified PRACH within that subframe in ascending order of frequency domain such that 0≤f_id<6, and X is the used binary value of one or zero and is one of is_PCell and is_SCell, which indicates whether the user equipment performed the random access attempt on the PCell or on one of the plurality of SCells so that RNTI is no greater than 120, wherein RNTIs for random access attempts on a PCell are within a range of values between 1-60, wherein RNTIs for random access attempts on any of the plurality of SCells are within a range of values between 61-120, wherein when the user equipment performs the random access attempt on the PCell the user equipment only reads and decodes a random access response having an RNTI within the range of values between 1-60 and when the user equipment performs the random access attempt on one of the plurality of SCells the user equipment only reads and decodes a random access response having an RNTI within the range of values between 61-120, and wherein the random access response is always sent over the PCell regardless of whether the random access attempt is on the PCell or one of the plurality of SCells.

6. A user equipment capable of performing random access in a radio communication system comprising:

a transceiver configured to
  perform a random access attempt on either a PCell or one of a plurality of SCells; and
  receive a random access response including a Radio Network Temporary Identifier (RNTI);

a processor configured to determine whether the random access response is intended for the user equipment based on the RNTI using a binary value of one or zero depending upon whether the user equipment's random access attempt is on the PCell or one of the plurality of SCells wherein the RNTI is generated from an equation RNTI=1+t_id+10*f_id+(60*X), where t_id is an index of a first subframe of a specified Physical Random Access Control Channel (PRACH) such that 0≤t_id<10, f_id is an index of the specified PRACH within that subframe in ascending order of frequency domain such that 0≤f_id<6, and X is the used binary value of one or zero and is one of is_PCell and is_SCell, which indicates whether random access is performed on the the PCell or on one of the plurality of SCells so that RNTI is no greater than 120, wherein RNTIs for random access attempts on a PCell are within a range of values between 1-60, wherein RNTIs for random access attempts on any of the plurality of SCells are within a range of values between 61-120, wherein when the user equipment performs the random access attempt on the PCell the user equipment only reads and decodes a random access response having an RNTI within the range of values between 1-60 and when the user equipment performs the random access attempt on one of the plurality of SCells the user equipment only reads and decodes a random access response having an RNTI within the range of values between 61-120, and wherein the random access response is always sent over the PCell regardless of whether the random access attempt is on the PCell or one of the plurality of SCells.

* * * * *